C. W. GAMBLE.
SOLDERING IMPLEMENT.
APPLICATION FILED AUG. 16, 1911.
1,010,891.
Patented Dec. 5, 1911.
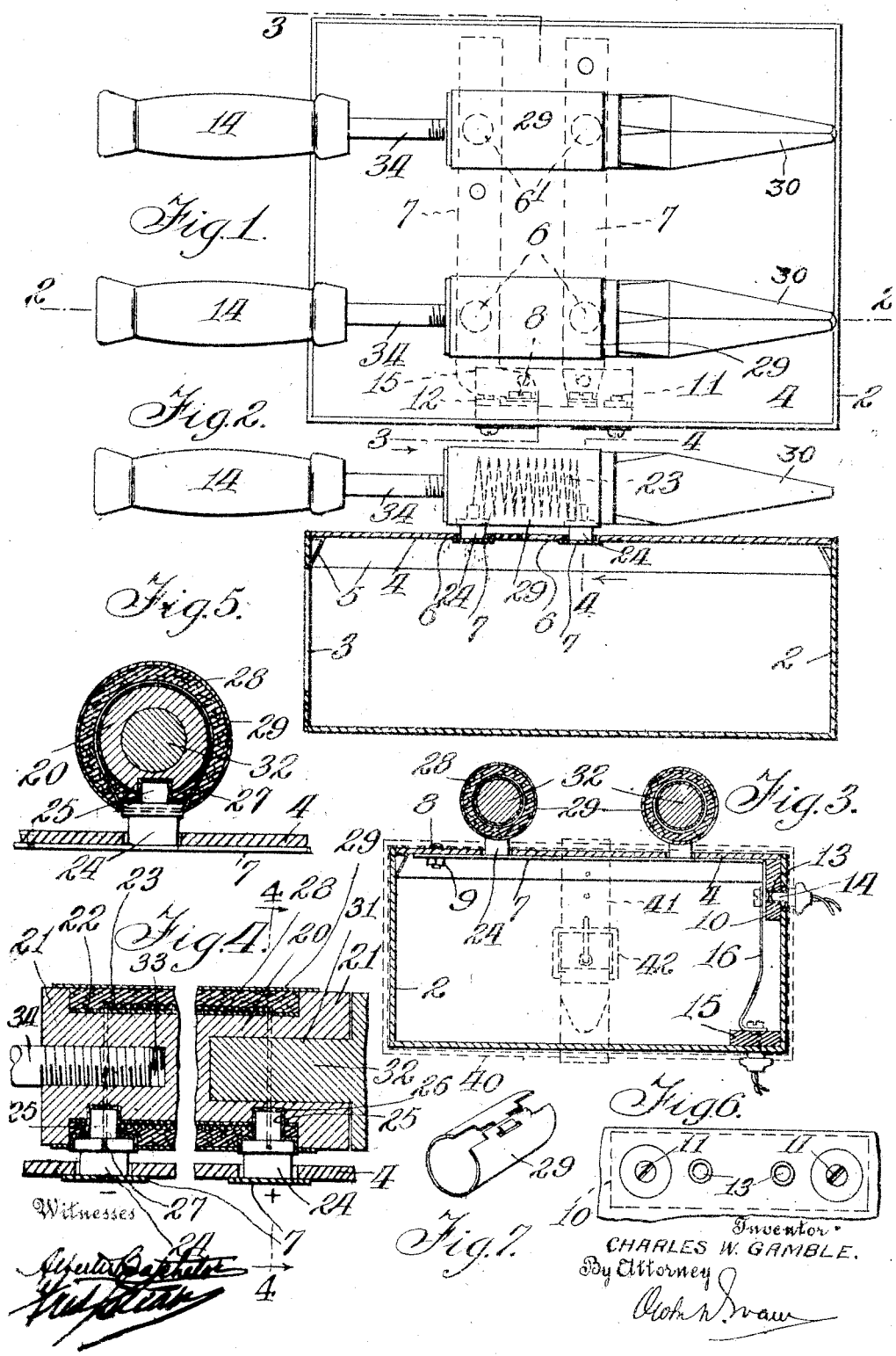
Witnesses
Inventor
CHARLES W. GAMBLE.
By Attorney

UNITED STATES PATENT OFFICE.

CHARLES WALKER GAMBLE, OF MONTREAL, QUEBEC, CANADA.

SOLDERING IMPLEMENT.

1,010,891.  Specification of Letters Patent.  Patented Dec. 5, 1911.

Application filed August 16, 1911. Serial No. 644,315.

*To all whom it may concern:*

Be it known that I, CHARLES WALKER GAMBLE, a subject of the King of Great Britain, residing at Montreal, Province of Quebec, Dominion of Canada, have invented certain new and useful Improvements in Soldering Implements; and I do hereby declare that the following is a full, clear, and exact description thereof.

This invention relates to soldering implements or devices adapted to be heated by electricity and it has for its object to provide an improved and simplified construction for a "soldering iron" of the type in which the tip may be completely detached from and attached to the electrical feed connections before or after being heated thereby, the invention also having for an object the provision of an improved stand for carrying the tool. For full comprehension however of the invention and of the objects and advantages thereof reference will be had to the following description and appended claims, and to the accompanying drawings forming a part of this specification in which similar reference characters indicate the same parts and wherein, Figure 1 is a plan view of my improved device, Fig. 2 is a vertical sectional view taken on the line 2—2 Fig. 1 the soldering iron being shown in elevation, Fig. 3 is a vertical sectional view taken at right angles to Fig. 2 on the line 3—3 Fig. 1, Fig. 4 is an enlarged longitudinal section of the tool and a portion of the stand illustrating particularly the means for electrically heating the tip. Fig. 5 is a transverse section taken on the line 4—4 Fig. 4, Fig. 6 is a detail side view of a portion of the stand illustrating particularly the means whereby the feed wires may be attached thereto, and Fig. 7 is a detail perspective view of the jacket or casing for the part of the tool carrying the heating coil.

In carrying out my invention I provide a stand, which I prefer to make portable, through which the electrical connections are made to the soldering tool proper. This stand as shown in the drawings preferably comprises a box 2 open at one end 3 in which the tool or tools may be placed when being transported as would be necessary when forming part of a plumber's or like outfit. This box preferably has a top 4 of asbestos or the like supported on inwardly projecting flanges 5 on the sides of the box, this top 4 having a plurality of openings (preferably comprising the pairs 6 and 6' respectively) through which the terminals or contact makers of the tool, to which reference will presently be made, project. When the bolt is being heated these contact makers rest upon flat contact strips 7 of brass or the like which extend along the underside of the top 4 and close the openings 6 and 6' there being two of these strips one for feed and one for return. One end of each strip 7 is suitably secured as by screws 8 and nuts 9 threaded thereon to the top 4, the opposite ends being bent downwardly adjacent a fiber block 10 fastened as by the screws 11 and nuts 12 to the wall of the box near the top thereof, such ends being electrically connected to sockets 13 through which suitable electrical connections may be made in a well known manner, as indicated at 14.

When the device is to be set permanently on a work bench the electrical connection may be made through a second fiber block and socket connection indicated at 15 similar to that just described at the bottom of the box and connected by wires 16 to the strips 7.

The tool proper comprises a core 20 of brass or the like having flanged ends 21. This core is covered with an insulating layer 22 of mica or the like upon which is wound the heating coil 23 which makes electrical contact at its opposite ends with respective ones of a pair of contact making studs or posts 24 (above referred to as projecting into the openings 6 and 6') whose diminished inner ends 25 are set in recesses in the core 20, being insulated therefrom by suitable means as the mica packing shown at 26. The posts 24 may be held in place and the ends of the coil 23 connected thereto by means of loops 27 also of high resistance wire which pass through transverse openings in the posts and around the core and have their ends secured together and to the ends of the coil 23 in any suitable manner. The coil 23 is covered by a suitable covering 28 which may be of asbestos or the like while over the latter is placed a casing or jacket 29, the manner of constructing which is shown most particularly in Fig. 7.

To receive the tip 30 the core 20 is formed at one end with an axial recess 31 in which the diminished end 32 of the tip fits tightly while the opposite end of the core has a tapped boring 33 in which is screwed the shank 34 of a suitable handle 14.

To heat the tip the tool is placed upon the box or stand with the posts 24 projecting through the openings 6 or 6' and making contact with and being supported upon the strips 7 thereby closing the circuit through the coil 23.

With my improved device constructed as herein set forth a very convenient electrically heated device is provided which does away entirely with the inconvenience of carrying the feed wires up through the handle and which forms a very simple and convenient portable soldering implement, the stand 2 serving also as a box in which the tool can be placed when being carried from place to place.

As shown particularly in Figs. 1 and 3 a simple arrangement of the contact members is provided which enables a pair of irons to be heated at the same time.

When used as a portable device a cover indicated in dotted lines at 40 may be placed over the box after the tools have been placed therein and a strap shown in dotted lines 41 may be passed therearound and attached thereto by the cleats 42 to enable the device to be conveniently carried.

What I claim is as follows:

1. An electrically heated soldering tool comprising a core, a soldering tip carried thereby, a heating coil wound upon such core means insulating such coil from the core, a pair of laterally projecting posts connected to opposite ends of such coil, and adapted to serve as contact members through which electric current is supplied to the coil, and means insulating such posts from the said core.

2. An electrically heating soldering tool comprising a core circular in cross section and having laterally projecting flanges formed integrally therewith upon opposite ends thereof, a soldering tip carried thereby, a heating coil wound upon such core between the said flanges, means insulating the coil from the core, a pair of laterally projecting posts connected to opposite ends of such coil and adapted to serve as contact members through which electric current is supplied to such coil, means insulating such posts from the core, a heat resisting cover for the coil, and a casing surrounding such covering and overlapping at its ends the flanges on the ends of the core.

3. An electrically heated soldering tool comprising a core circular in cross section, such core being formed at opposite ends with axially extending recesses one of such recesses being tapped, a handle having its shank threaded into the tapped recess, a soldering bolt fitting tightly into the other recess, a heating coil wound upon such core, means insulating such coil from the core, a pair of laterally projecting posts connected to opposite ends of such coil and adapted to serve as contact members through which electric current is supplied to the coil, and means insulating such posts from the said core.

4. In a device of the class specified, in combination a soldering tool having a heating coil and a pair of contact posts connected to opposite ends thereof and projecting from the tool, a stand for such tool such stand comprising a box having a top provided with openings, adapted to receive the said contact posts, a pair of contact members located below such top and adjacent the said openings, and means for supplying electric current to such contact strips.

5. As a means for simultaneously electrically heating a plurality of soldering tools each having a heating coil and a pair of contact posts, a stand having an asbestos top provided with a plurality of pairs of openings, a pair of contact strips located on the underside of the top and extending across the corresponding openings of each pair and adapted to have the posts of heating tool rest thereon and means for supplying electric current through such strips to the said coil.

In testimony whereof, I have signed my name to this specification, in the presence of two subscribing witnesses.

CHARLES WALKER GAMBLE.

Witnesses:
 STANLEY KING,
 JAMES C. FRASER.